Jan. 21, 1969  J. B. ROBINSON  3,423,561
METHOD OF MAKING HORSE BITS BY ELECTRICAL WELDING
Filed April 5, 1965
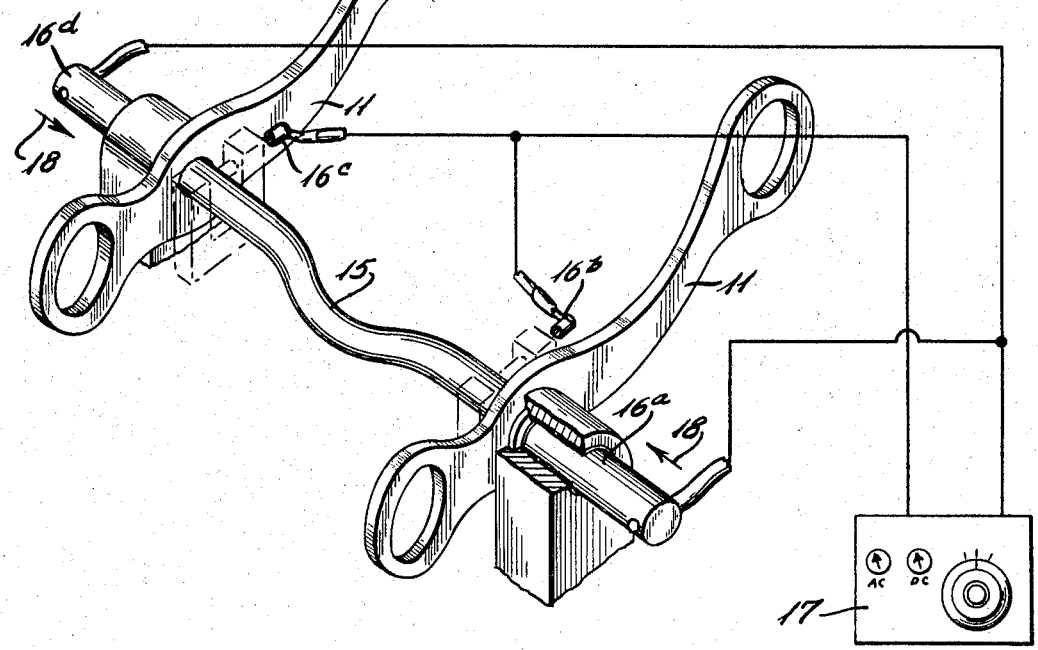
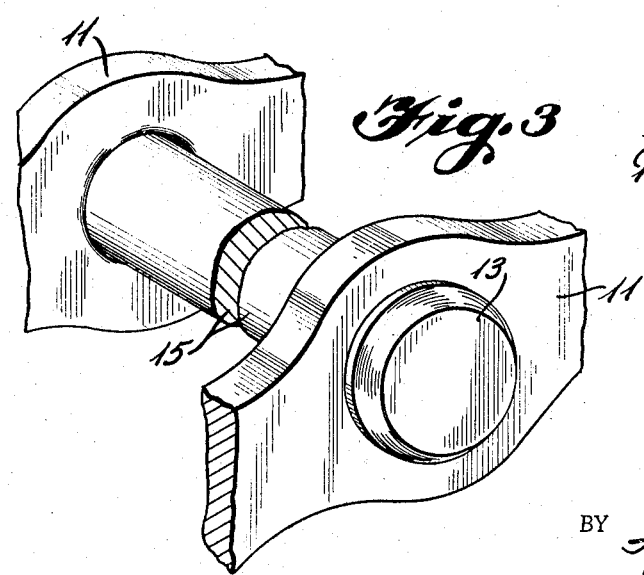
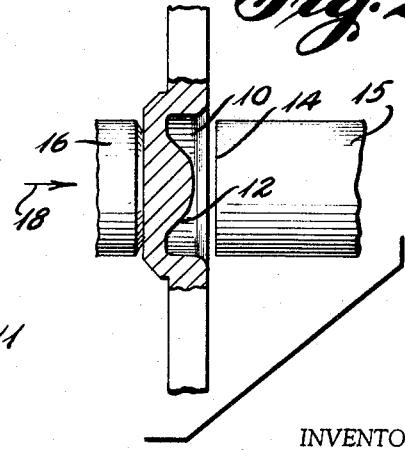
INVENTOR
James B. Robinson
BY  H. Yates Dowell Jr. & II
ATTORNEYS

United States Patent Office 3,423,561
Patented Jan. 21, 1969

3,423,561
METHOD OF MAKING HORSE BITS BY ELECTRICAL WELDING
James B. Robinson, Chattanooga, Tenn., assignor to American Manufacturing Company, Chattanooga, Tenn.
Filed Apr. 5, 1965, Ser. No. 445,552
U.S. Cl. 219—107　　1 Claim
Int. Cl. B23k 31/00

ABSTRACT OF THE DISCLOSURE

A method of making horse bits includes the steps of forming in a cheek plate a recess having a central raised portion of a height less than the depth of the recess, inserting the end of a crossbar into the recess and passing an electrical current of sufficient intensity through the said raised portion and the end of the crossbar to melt the metal and form a welded joint.

---

This invention relates to metalworking and more particularly to an improved horse bit and the method of manufacturing the same.

The invention also relates to a method of making welded joints and more particularly to a method of making a horse bit utilizing such welded joint.

In recent years the horse population in the United States has approximately doubled because of the growth of thoroughbred racing and the recreational use of saddle horses, and consequently considerable impetus has been given to the manufacture of horse bits. Horse bits consist of a pair of cheek plates joined by a cross bar which is inserted in the horse's mouth. It is essential that the members be joined in a smooth fashion to avoid irritation to the horse, and it is highly desirable that the joint be resistant to rupture under the repeated flexing and leverage horses place upon the bit while being controlled, because apart from all questions of long life, it could be quite dangerous if the joint should rupture while in use to control a balky horse. In addition, economy of manufacture is also important.

A widely used manufacturing method involves the insertion of square ends cut on the round cross bar into square holes in the cheek plate. The ends are then peened. The peened portion is then covered with a disk held in place by a pin. While such joints are free from surfaces which might irritate the horse's mouth, and have a relatively long life, they are subject to eventual breakage at the joints and involve expensive and time-consuming manufacturing operations.

A major object of this invention is to provide a method of making horse bits having stronger joints than those previously available.

A further object of the invention is to provide a method of making horse bits utilizing a welded joint without objectionable flashing at the juncture of the cross bar and the cheek plates.

A further object of the invention is to provide a horse bit which is more economical to manufacture than prior methods of making bits.

In achieving these and other objects one feature of this invention resides in the method of stamping recesses in the cheek plates having a raised frusto-conical portion in the central portion, inserting the cross bars in the recess, and applying electric current to the joint to melt the metal interface to form a welded joint while maintaining compressive forces on the cheek plates so as to keep the cross bars and the cheek plates in engagement during the welding operation. Applicant, who has been engaged in horse bit manufacture for some time, has found that through the use of this method the cost of each item has been substantially reduced, and that the joint is substantially stronger.

These and other objects and features of the invention may be better appreciated by reference to the drawing in which:

FIG. 1 is a perspective view of a horse bit in the process of manufacture according to the present invention;

FIG. 2, a sectional view through the center of a recessed stamped end in the cheek plate and illustrating the end of a cross bar in exploded relationship thereto as seen before the formation of a welded joint; and FIG. 3, a perspective view of portions of a horse bit manufactured according to the present invention, showing the absence of flashing on the interior surface of the cheek plate at the joint.

Referring to the drawings it will be seen that a recess 10 has been stamped in each cheek plate 11 of a horse bit while cold by a coining process which raises a frusto-conical central portion 12 within the recess and a disk-like portion 13 on the opposite side of the cheek plate. The cheek plates are blanked and then tumbled smooth before the recesses are coined.

The recess 10 is sufficiently larger in diameter than the cross bar 15 so that the cross bar easily fits within the recess and so that the end 14 of the cross bar can easily be maintained in contact with the raised frusto-conical portion 12.

To weld the cheek plates and the cross bar together suitable electrical contacts 16A, 16B, 16C and 16D of a resistance welding unit 17 are connected to the cross bar and cheek plates and a compressing force 18 is maintained to hold the cheek plates firmly against the ends of the cross bar. During this welding operation the cheek plates are squeezed approximately 3/32 of an inch closer together. Because the cross bar is of lesser diameter than the recess, the bar sits loosely in it and is held in close electrical contact with the raised frusto-conical portion of the cheek plates at all times during the welding operation. All of the melted metal is retained within the recess so that no objectionable burr is formed on the inner surface of the cheek plates at the cross bar juncture.

The bit which results from the practice of the method described is neat in appearance, has no protrusions or rough portions which might irritate the horse, and is substantially stronger at the joints than bits that have been previously used to my knowledge. Furthermore the bit involves fewer manufacturing operations than those necessary to produce bits heretofore known and resultingly may be manufactured at substantially less expense.

Various changes in the details of practicing the invention will occur to those skilled in the art and, accordingly, the invention is not limited to the details as described, but only in accordance with the following claim.

I claim:

1. A method of making horse bits comprising:
    providing a metallic cheek member and a metallic crossbar member,
    forming in the cheek member a recess having a transverse cross-section substantially similar to that of the end of the crossbar member, said recess being sufficiently large to receive the end of the crossbar loosely therein and sufficiently small to retain all flashing material within the recess after the welding step recited hereinafter so that the flesh of a horse's mouth will not be able to engage the flashing material,
    forming a raised portion in the bottom of the recess of a height less than that of the depth of the recess,
    inserting the end of the crossbar within the recess to engage the said raised portion with the sides of the recess holding the crossbar in position for a welding operation, and passing an electrical current of sufficient intensity and for a sufficient period of time through the end of the crossbar and the raised portion to melt the metal and form a welded joint therebetween.

References Cited

UNITED STATES PATENTS

| | | | |
|---|---|---|---|
| 945,555 | 1/1910 | Lachman. | |
| 1,004,795 | 10/1911 | Lachman | 219—105 |
| 1,142,241 | 6/1915 | Ellinger | 219—107 |
| 1,167,541 | 1/1916 | Bass. | |
| 1,252,142 | 1/1918 | Murray | 219—107 |
| 1,792,378 | 2/1931 | Kerruish. | |
| 2,006,032 | 6/1935 | Rupert. | |
| 2,447,085 | 8/1948 | Odlum | 219—104 |
| 2,779,612 | 1/1957 | Edelen | 219—107 |

RICHARD M. WOOD, *Primary Examiner.*

W. D. BROOKS, *Assistant Examiner.*

U.S. Cl. X.R.

219—103; 54—7